(12) United States Patent
Chen et al.

(10) Patent No.: US 10,520,717 B2
(45) Date of Patent: Dec. 31, 2019

(54) BINOCULAR CAPABLE OF MEASURING DISTANCE AND PRISM MODULE THEREOF

(71) Applicants: Sintai Optical (Shenzhen) Co., Ltd., ShenZhen, Guandong Province (CN); Asia Optical Co., Inc., Taichung (TW)

(72) Inventors: Yue-Ye Chen, ShenZhen (CN); Hua-Tang Liu, ShenZhen (CN); Zhi-Wei Gao, ShenZhen (CN); Sheng Luo, ShenZhen (CN); Jian-Mei Chen, ShenZhen (CN); Ming Zhou, ShenZhen (CN)

(73) Assignees: SINTAI OPTICAL (SHENZHEN) CO., LTD., Shenzhen, Guandong Province (CN); ASIA OPTICAL CO., INC., Taichung (TW)

( * ) Notice: Subject to any disclaimer, the term of this patent is extended or adjusted under 35 U.S.C. 154(b) by 521 days.

(21) Appl. No.: 15/397,964

(22) Filed: Jan. 4, 2017

(65) Prior Publication Data
US 2017/0276927 A1    Sep. 28, 2017

(30) Foreign Application Priority Data

Mar. 22, 2016    (CN) .......................... 2016 1 0165479

(51) Int. Cl.
| | |
|---|---|
| *G02B 23/10* | (2006.01) |
| *G01S 7/481* | (2006.01) |
| *G02B 5/20* | (2006.01) |
| *G02B 23/04* | (2006.01) |

(52) U.S. Cl.
CPC ............ *G02B 23/10* (2013.01); *G01S 7/4812* (2013.01); *G02B 5/208* (2013.01); *G02B 23/04* (2013.01)

(58) Field of Classification Search
CPC ......... G01C 3/04; G01S 17/08; G01S 7/4812; G02B 23/04; G02B 23/10; G02B 23/18; G02B 5/04; G02B 7/06
See application file for complete search history.

(56) References Cited

U.S. PATENT DOCUMENTS

| | | | | | |
|---|---|---|---|---|---|
| 2,910,912 | A | * | 11/1959 | Wohler .................... | G01C 3/04 356/10 |
| 3,484,149 | A | * | 12/1969 | Becker .................... | G02B 7/28 359/414 |
| 5,262,838 | A | * | 11/1993 | Tocher .................... | G01C 3/04 356/16 |

(Continued)

*Primary Examiner* — William R Alexander
*Assistant Examiner* — Balram T Parbadia
(74) *Attorney, Agent, or Firm* — McClure, Qualey & Rodack, LLP

(57) ABSTRACT

A prism module includes a first prism including a first surface, a second surface and a third surface, a roof prism including a roof surface and a fourth surface, a second prism including a fifth surface, a sixth surface and a seventh surface, and a third prism including a light access surface, a first reflecting surface and a second reflecting surface. A light source is disposed above the second prism and adjacent to the first and the roof prisms. A light beam emitted by the light source enters and is reflected by the third prism, enters the second prism through the seventh surface, passes through the sixth surface, enters the first prism through the third surface, and is reflected by the second surface to leave the prism module. The light beam leaving the prism module is parallel to a baseline passing through the first, the second and the fourth surfaces.

20 Claims, 7 Drawing Sheets

(56) References Cited

U.S. PATENT DOCUMENTS

| | | | | |
|---|---|---|---|---|
| 6,236,504 B1 * | 5/2001 | Kao | G02B 23/18 | 359/412 |
| 6,292,314 B1 * | 9/2001 | Perger | G02B 23/10 | 359/638 |
| 6,304,395 B1 * | 10/2001 | Ito | G02B 5/04 | 359/584 |
| 6,441,887 B1 * | 8/2002 | Kao | G01C 15/002 | 356/4.01 |
| 7,505,120 B2 * | 3/2009 | Ing-Song | F41G 1/473 | 356/4.01 |
| 7,999,924 B2 * | 8/2011 | Watanabe | G01C 3/04 | 356/3.01 |
| 8,149,507 B2 * | 4/2012 | Heintz | F41G 3/02 | 359/399 |
| 8,743,489 B2 * | 6/2014 | Perger | G02B 17/045 | 359/835 |
| 9,097,892 B2 * | 8/2015 | Bach | G02B 5/04 | |
| 2001/0026409 A1 * | 10/2001 | Kanai | G02B 5/04 | 359/833 |
| 2004/0184023 A1 * | 9/2004 | Kao | G01C 3/08 | 356/4.01 |
| 2005/0200965 A1 * | 9/2005 | Staley, III | G02B 23/10 | 359/634 |
| 2007/0211343 A1 * | 9/2007 | Clark | G02B 5/04 | 359/577 |
| 2009/0079958 A1 * | 3/2009 | Gunther | G01S 7/481 | 356/5.01 |
| 2009/0091821 A1 * | 4/2009 | Regan | G02B 5/208 | 359/351 |
| 2009/0116105 A1 * | 5/2009 | Lee | G02B 7/1805 | 359/407 |
| 2009/0174939 A1 * | 7/2009 | Heintz | F41G 3/02 | 359/480 |
| 2010/0202048 A1 * | 8/2010 | Amitai | H04N 13/344 | 359/485.02 |
| 2014/0327902 A1 * | 11/2014 | Giger | G01S 17/08 | 356/5.01 |
| 2015/0055116 A1 * | 2/2015 | Liu | G01S 7/481 | 356/4.01 |
| 2017/0074650 A1 * | 3/2017 | Mrl k | G01C 3/04 | |

* cited by examiner

BINOCULAR CAPABLE OF MEASURING DISTANCE AND PRISM MODULE THEREOF

BACKGROUND OF THE INVENTION

Field of the Invention

The invention relates to a binocular and the prism module thereof, and more particularly to a binocular capable of measuring distance and the prism module thereof.

Description of the Related Art

FIG. 1 depicts a prior binocular capable of measuring distance, with light paths shown. The prior binocular includes a left optical system 10 and a right optical system 20. The right optical system 20 includes a laser diode 52 and an organic light-emitting diode (OLED) 63 configured to produce light containing an image and a reticle message. In operation, the light containing the image and reticle message is reflected by a reflecting mirror 58, enters a prism module 22, is reflected by the prism module 22, and passes through an ocular 26 to be observed by a user. A laser beam B is emitted by the laser diode 52, is reflected by a reflecting mirror 60 to enter the prism module 22, passes through a pentagon prism 222, is reflected by a quadrangle prism 224 (Pechan prism) to leave the prism module 22, and is projected to an object (not shown) through an objective module 24. The object reflects the laser beam B to generate a laser beam C. The laser beam C enters a prism module 12 through an objective module 14 of the left optical system 10, is reflected by a quadrangle prism 124, passes through a pentagon prism 122, is reflected by a reflecting mirror 62, and is received by a laser receiver 54. Visible light beams A, A' respectively pass through the objective modules 14, 24 and Schhmidt-Pechan prisms of the prism modules 12, 22 to form an erect image, and the erect image can be observed through an ocular 16 and the ocular 26. The visible light beams A, A' received by the binocular are utilized to form an erect image of the object for an observation by the user, and the laser beam B emitted by the binocular is utilized to measure the distance from the binocular to the object.

In the structure described above, the laser diode 52 is arranged to be disposed near the ocular 26 so as to avoid the organic light-emitting diode (OLED) 63. However, the arrangement of the laser diode 52 is disadvantageous to the appearance design of the ocular 26.

FIG. 2 depicts the internal structure of another prior binocular capable of measuring distance, wherein the laser diode 52 and a laser receiver 54 are respectively disposed near objective modules 50, 50'. Because a transmissive-type organic light-emitting diode (OLED) has not been available and a general organic light-emitting diode (OLED) does not meet the requirements, a transmissive liquid crystal display (LCD) is used to be disposed on the light path.

BRIEF SUMMARY OF THE INVENTION

The invention provides a binocular capable of measuring distance and prism module thereof. Since the light source and the light receiver for measuring distance are disposed above or below the prism module, the binocular is allowed to use the organic light-emitting diode to generate the reticle. Therefore, the appearance design is optimized by effectively using the space above or below the prism module.

The prism module in accordance with an embodiment of the invention includes a roof prism, a first prism, a second prism and a third prism. The first prism includes a first surface, a second surface and a third surface. The roof prism includes a roof surface and a fourth surface adjacent to the second surface. The second prism includes a fifth surface, a sixth surface adjacent to the third surface, and a seventh surface. The third prism is disposed higher than the second prism. The third prism includes a light access surface, a first reflecting surface and a second reflecting surface, and the light access surface is partly adjacent to the seventh surface. A baseline is configured to pass through the first and the second surfaces of the first prism and the fourth surface of the roof prism. A light source is disposed above the second prism, near a side of the third prism, and adjacent to the first and the roof prisms. The light source is configured to emit a first light beam. The first light beam enters the third prism, is reflected by the third prism, enters the second prism through the seventh surface, passes through the sixth surface of the second prism, enters the first prism through the third surface, and is reflected by the second surface of the first prism to leave the prism module. The first light beam leaving the prism module is parallel to the baseline.

The meaning of the above phrase "adjacent to" includes "next to" or "spaced from".

In another embodiment, the first light beam enters the third prism through the light access surface, and is reflected by the first and the second reflecting surfaces to enter the second prism through the light access surface.

In another embodiment, the first prism further includes a coating disposed on the second surface, and the first light beam is reflected by the coating to leave the prism module.

In another embodiment, a visible light beam enters the first prism through the first surface, is reflected a plurality of times in the first prism, leaves the first prism through the second surface, enters the roof prism through the roof prism, is reflected a plurality of times in the roof prism, and leaves the prism module, and the visible light beam leaving the prism module is parallel to the baseline.

In another embodiment, a second light beam including an image enters the second prism through the fifth surface, leaves the second prism through the sixth surface, passes through the first prism, enters the roof prism, is reflected by the roof prism and the fourth surface and leaves the prism module in a direction parallel to the baseline.

In another embodiment, the first prism further includes a coating disposed on the second surface, and the coating is configured to reflect an invisible light beam and allow a visible light beam to pass through.

The prism module in accordance with another embodiment of the invention includes a roof prism, a first prism, a second prism and a third prism. The first prism includes a first surface, a second surface and a third surface. The roof prism includes a roof surface and a fourth surface adjacent to the second surface. The second prism includes a fifth surface, a sixth surface adjacent to the third surface, and a seventh surface. The third prism is disposed higher than the second prism. The third prism includes a light access surface, a first reflecting surface and a second reflecting surface, and the light access surface is partly adjacent to the seventh surface. A baseline is configured to pass through the first and the second surfaces of the first prism and the fourth surface of the roof prism. A light receiver is disposed above the second prism, near a side of the third prism, and adjacent to the first and the roof prisms. A first light beam parallel to the baseline enters the first surface of the first prism, is reflected by the first prism, enters the second prism through the third surface, passes through the seventh surface of the second prism, enters the third prism through the light access surface, and is reflected by the third prism to leave the prism module through the light access surface.

In another embodiment, the first light beam enters the third prism through the light access surface, and is reflected by the first and the second reflecting surface to enter the light receiver through the light access surface.

The binocular capable of measuring distance in accordance with an embodiment of the invention includes a first optical system and a second optical system arranged parallel to the first optical system. The first optical system includes an objective module, the prism module described above, and an ocular module. The second optical system includes a light receiver. The first light beam emitted by the light source passes through the third prism, the prism module and the objective module, is projected to an object, is reflected by the object to the second optical system, and is received by the light receiver.

The binocular capable of measuring distance in accordance with another embodiment of the invention includes a first optical system and a second optical system arranged parallel to the first optical system. The second optical system includes an objective module, the prism module described above, and an ocular module. The first optical system includes a light source. The first light beam emitted by the light source is projected to an object through the first optical system, is reflected by the object to enter the prism module through the objective module, is reflected by the prism module, and enters the light receiver through the third prism.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
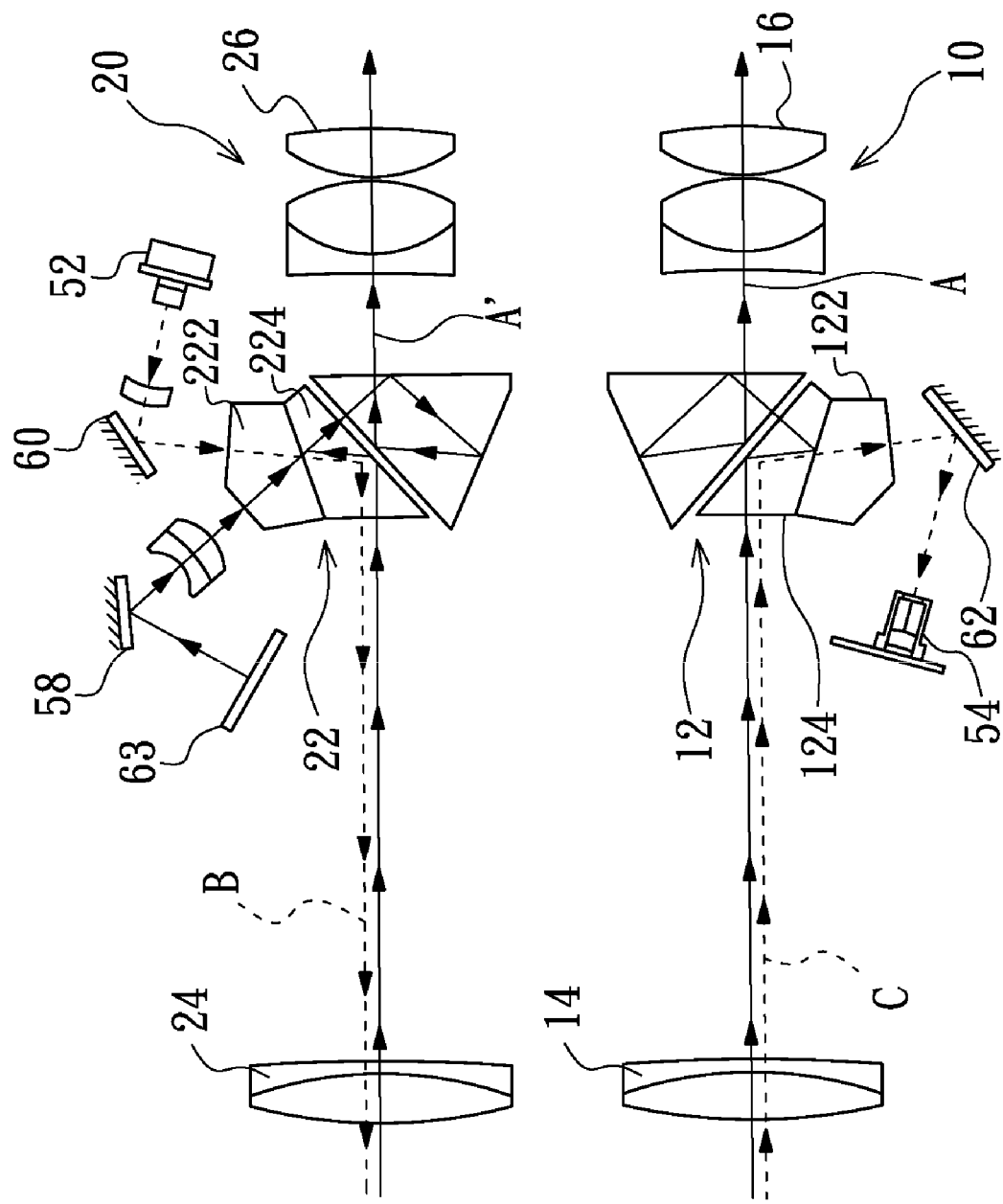
FIG. 1 depicts a prior binocular capable of measuring distance, with light paths shown therein.
Figure 2:
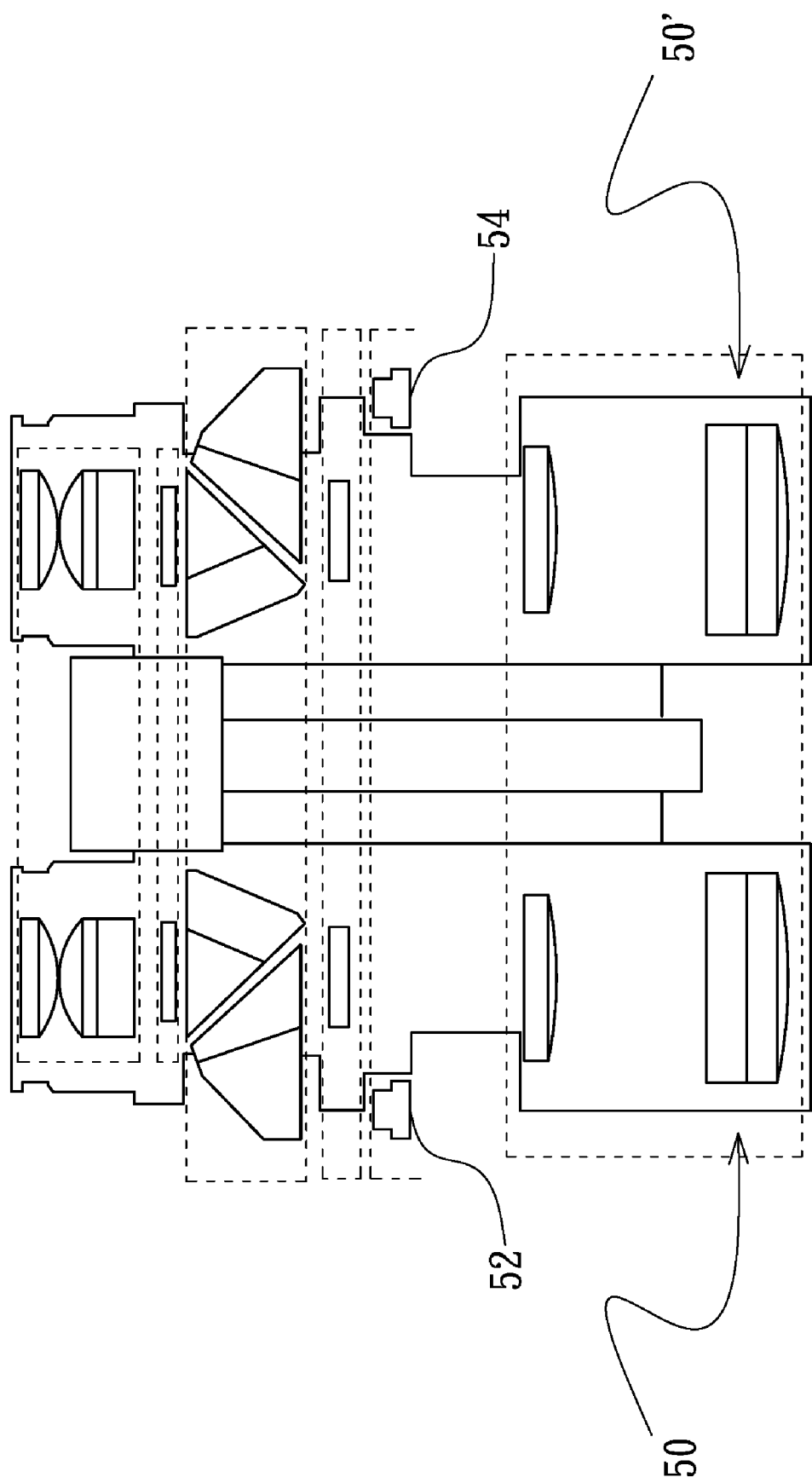
FIG. 2 depicts another prior binocular capable of measuring distance.
Figure 3:
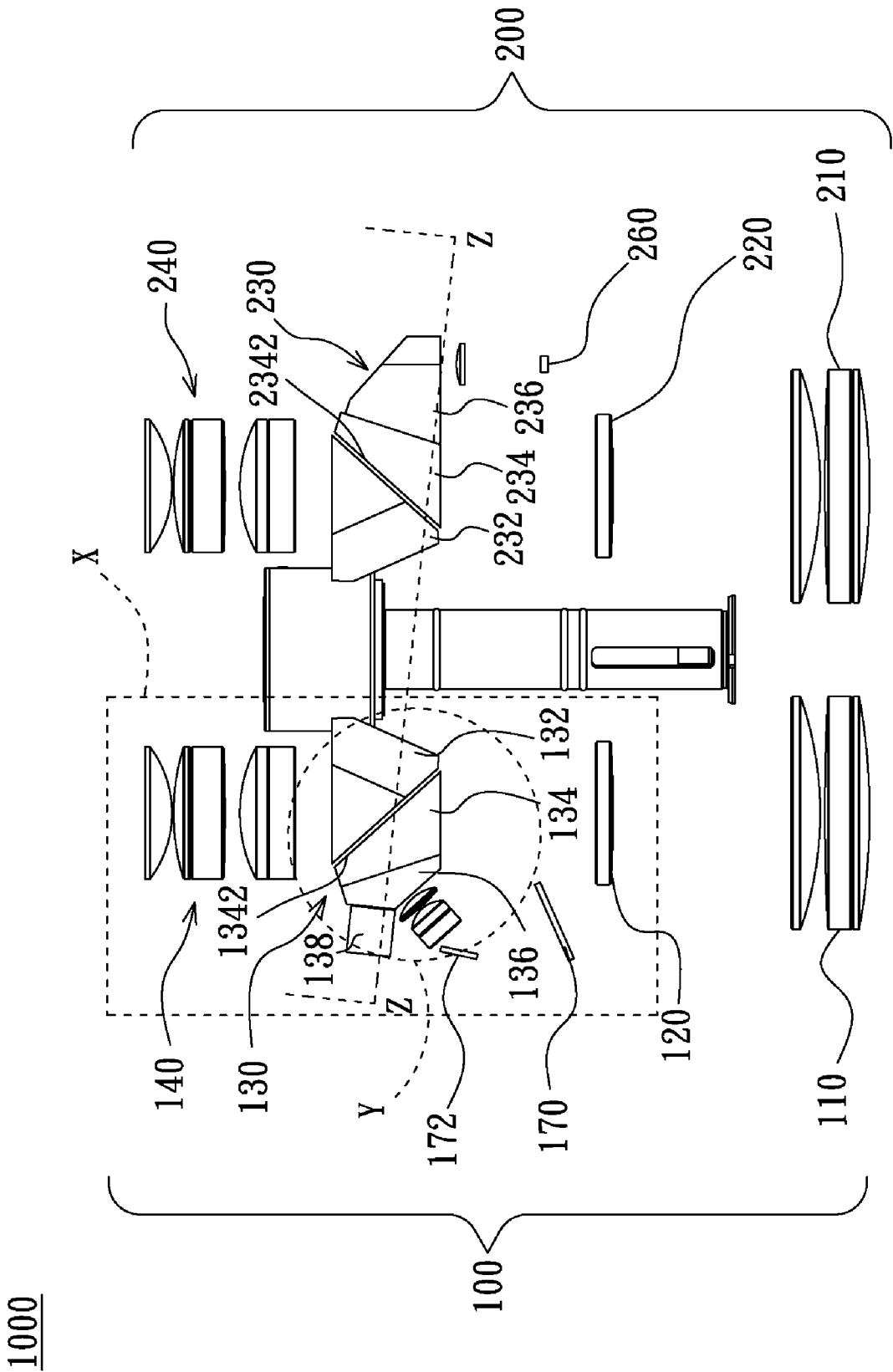
FIG. 3 is a schematic view of a binocular capable of measuring distance in accordance with an embodiment of the invention.

FIG. 3 depicts a binocular capable of measuring distance in accordance with an embodiment of the invention, wherein the binocular 1000 includes a first optical system 100 and a second optical system 200 respectively corresponding to user's right eye and left eye. The first optical system 100 includes an objective module 110, a focusing lens 120, a prism module 130 and an ocular module 140, and the second optical system 200 includes an objective module 210, a focusing lens 220, a prism module 230 and an ocular module 240. In operation, visible light beams pass through the objective modules 110, 210 to form an image. The focusing lenses 120 and 220 are moved to focus the image. The image is transformed into an erect image by the prism modules 130, 230, and the erect image can be observed through the ocular modules 140, 240.

Figure 4:
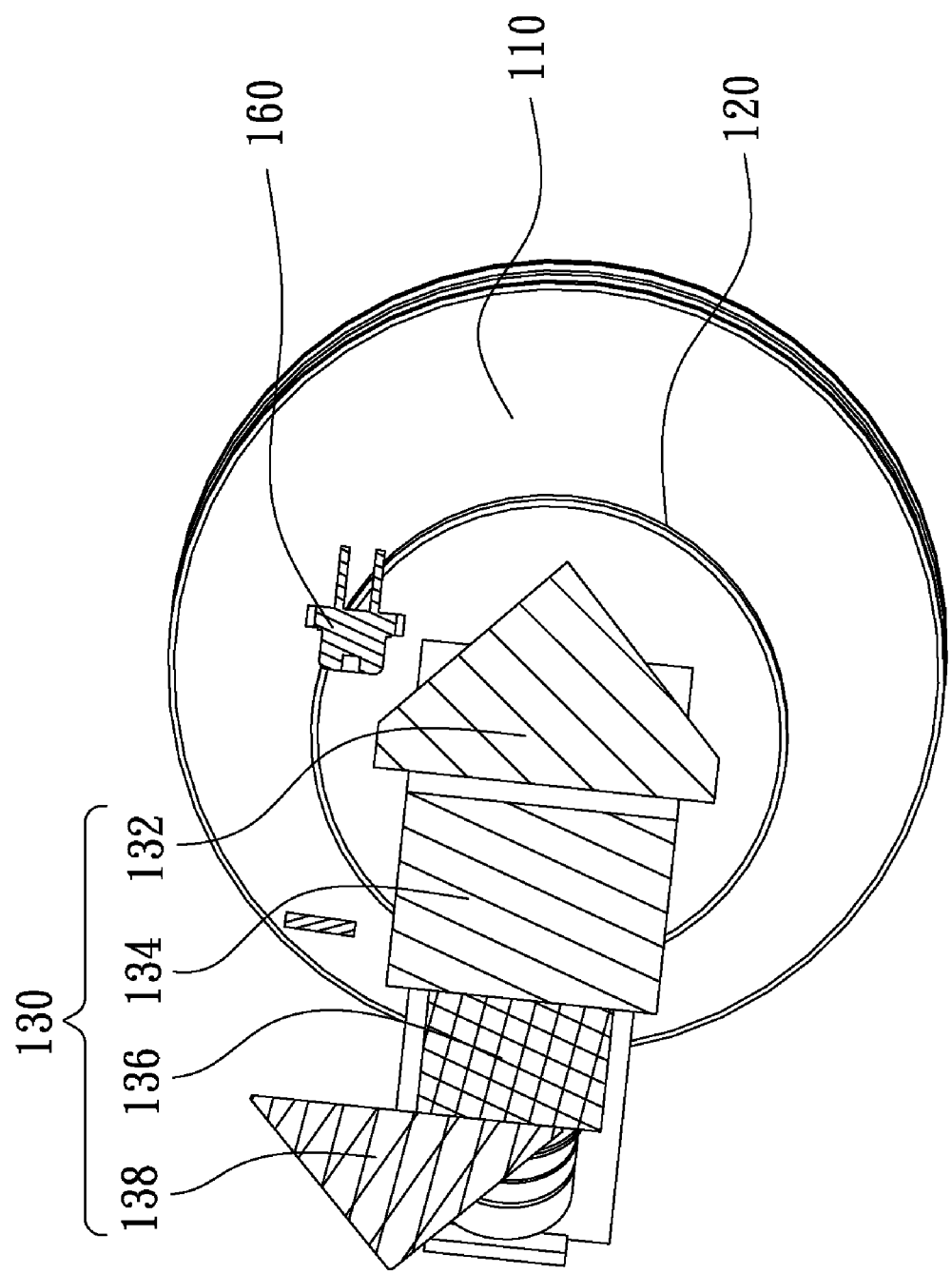
FIG. 4 is a sectional view of the binocular along line Z-Z in FIG. 3.
Figure 5:
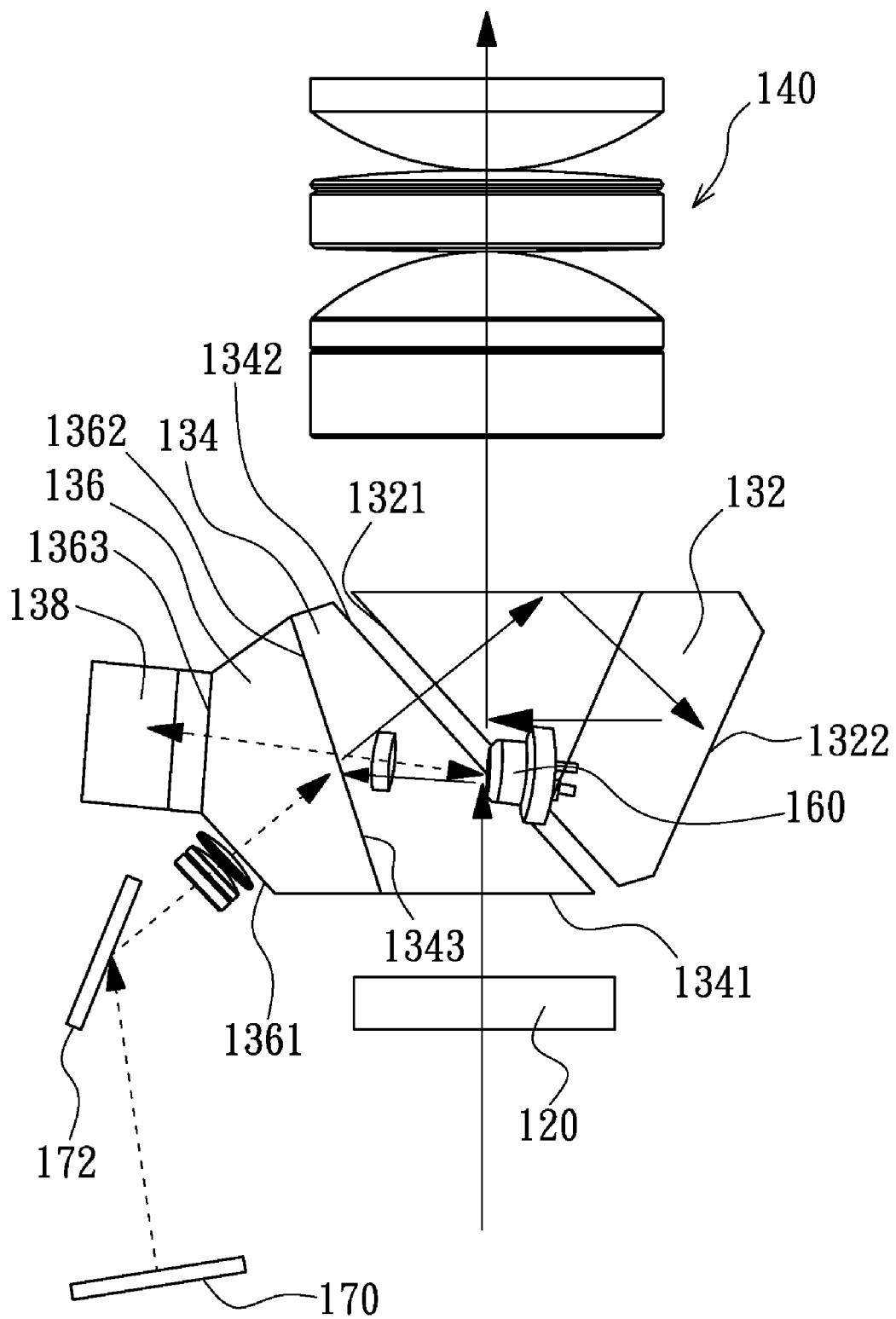
FIG. 5 is an enlargement view of part X in FIG. 3.
Figure 6:
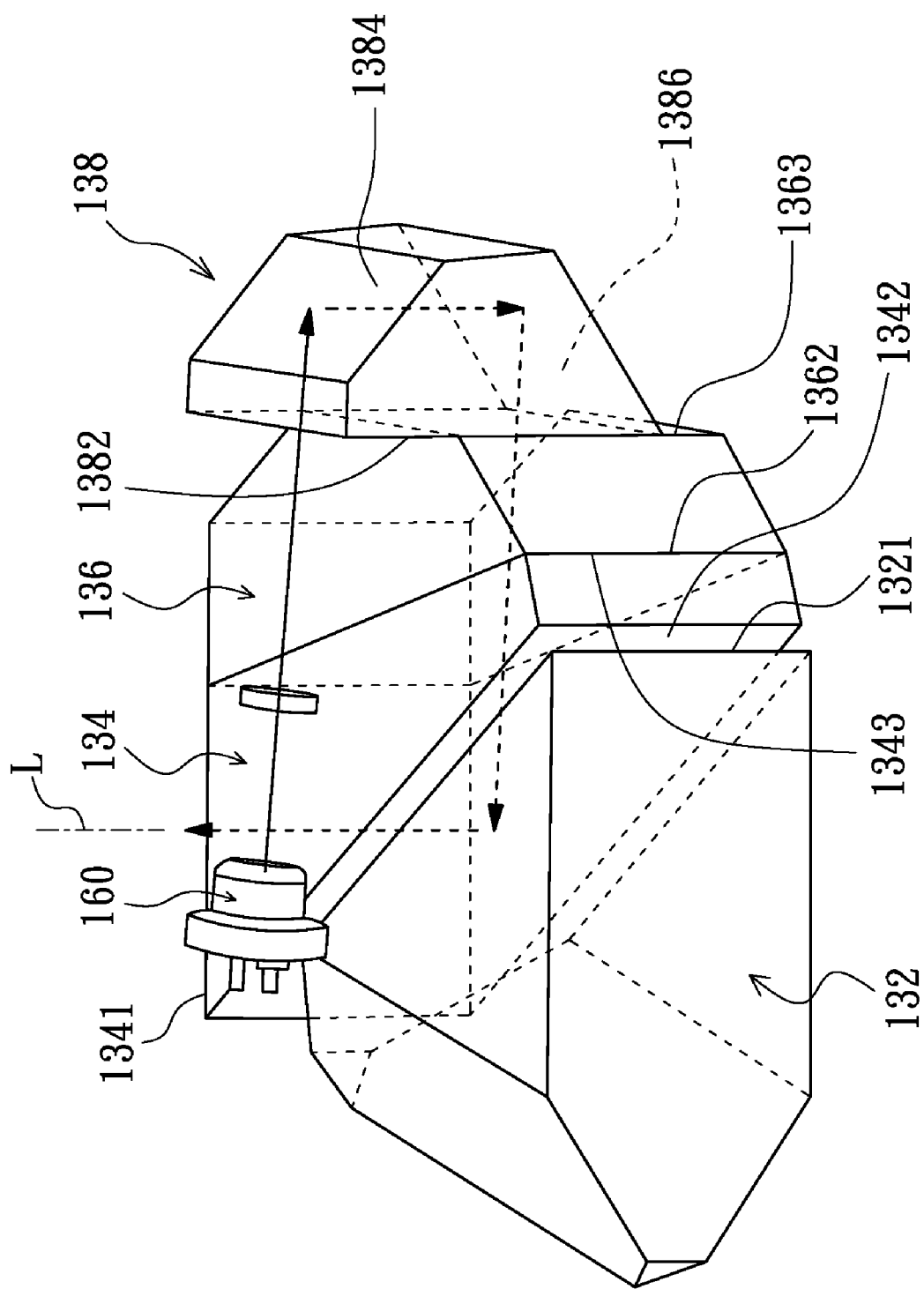
FIG. 6 is a perspective view of part Y in FIG. 3.

FIGS. 4-6 depict the structure of the binocular for measuring distance. The prism module 130 includes a roof prism 132, a first prism 134, a second prism 136 and a third prism 138. In the present embodiment, the first prism 134 is a quadrangle prism which includes a first surface 1341, a second surface 1342 and a third surface 1343. The roof prism 132 includes a fourth surface 1321 and a roof surface 1322. The second prism 136 is a pentagon prism which includes a fifth surface 1361, a sixth surface 1362 adjacent to the third surface 1343 of the first prism 134, and a seventh surface 1363. The third prism is a triangular prism which includes a light access surface 1382, a first reflecting surface 1384 and a second reflecting surface 1386. The fourth surface 1321 of the roof prism 132 is adjacent to the second surface 1342 of the first prism 134. The roof prism 132 and the first prism 134 constitute a Schhmidt-Pechan prism to transform the image of the visible light beams into the erect image. The path along which the visible light beam travels is shown in FIG. 5, wherein the visible light beam enters the first prism 134 through the first surface 1341, is reflected a plurality of times in the first prism 134, leaves the first prism 134 through the second surface 1342, enters the roof prism 132 through the fourth surface 1321, and is reflected a plurality of times in the roof prism 132 so that the image of the visible light beams is transformed into the erect image.

A light source 160 is disposed above the Schhmidt-Pechan prism. In operation, an invisible light beam (such as infrared) emitted by the light source 160 enters the third prism 138 through the light access surface 1382, is reflected by the first reflecting surface 1384 and the second reflecting surface 1386, enters the second prism 136 through the seventh surface 1363, passes through the second prism 136, and enters the first prism 134. A coating disposed on the second surface 1342 of the first prism 134 is configured to reflect the invisible light beam and allow a visible light beam to pass through. Therefore, the invisible light beam in the first prism 134 is reflected by the coating on the second surface 1342, passes through the objective module 110, and is projected forward. As shown in FIG. 6, the invisible light beam leaves the prism module 130 in a direction parallel to a baseline L which passes through the first surface 1341 and the second surface 1342 of the first prism 134 and the fourth surface 1321 of the roof prism 132. Moreover, as shown in FIGS. 3 and 5, an organic light-emitting diode 170 is configured to produce a light beam containing an image. The light beam containing the image is reflected by a reflecting mirror 172, enters the second prism 136 through the fifth surface 1361, leaves the second prism 136 through the sixth surface 1362, passes through the first prism 134, enters the roof prism 132, is reflected by the roof surface 1322 and the fourth surface 1321, and leaves the roof prism 132, and the image of the light beam can be observed through the ocular module 140.

As shown in FIG. 3, the described invisible light beam is reflected by an object, enters the prism module 230 through the objective module 210 of the second optical system 200, enters a first prism 234, is reflected by a second surface 2342, passes through a second prism 236, and is received by a light receiver 260. The distance from the binocular 1000 to the object is calculated after the light receiver 260 receives the invisible light beam.

In the present embodiment, the structure of the prism module 230 is similar to that of the prism module 130. The prism module 230 includes a roof prism 232, the first prism 234 and the second prism 236. Similarly, the combination of the roof prism 232 and the first prism 234 is a Schhmidt-Pechan prism. Therefore, an image of a visible light beam passing through the second optical system 200 is transformed into an erect image by the Schmidt-Pechan prism (The light path of the visible light beam in the prism module 230 is similar to that in the prism module 130 and therefore the descriptions thereof are omitted). However, it is noted that the prism module 230 does not have the third prism. In operation, the light beam reflected by the object is reflected by the second surface 2342 of the quadrangle prism 234, is reflected by the second prism 236, and is received by the light receiver 260.

In the present embodiment, the light source 160 is a laser diode, and the light receiver 260 is an avalanche photodiode.

In another embodiment, the positions of the light source 160 and the light receiver 260 are exchanged. Thus, the light receiver 260 is disposed above or below the Schhmidt-Pechan prism of the first optical system 100.

Figure 7:
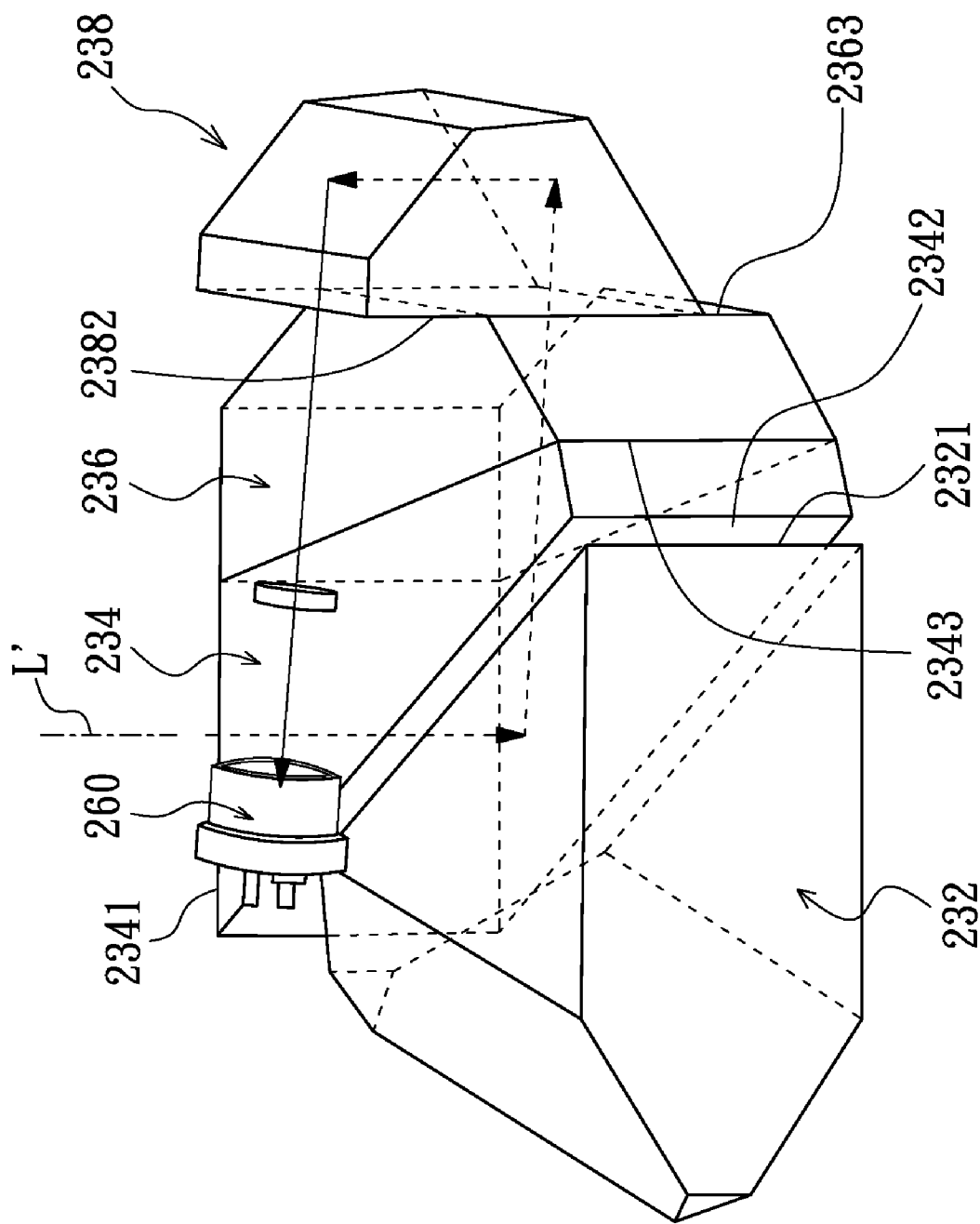
FIG. 7 is a perspective view of a binocular capable of measuring distance in accordance with another embodiment of the invention, wherein the prism module of the second optical system includes a third prism.

In yet another embodiment, the prism module 230 has the same structure as the prism module 130. That is, the prism module 230 has a third prism 238, and the light receiver 260 is disposed above or below the Schhmidt-Pechan prism. As shown in FIG. 7, a baseline L' passes through the first surface 2341 and the second surface 2342 of the first prism 234 and the fourth surface 2321 of the roof prism 232. A light beam reflected by an object enters the first prism 234 through the first surface 2341 in a direction parallel to the baseline L', is reflected by the first prism 234, enters the second prism 236 through the third surface 2343, passes through the seventh surface 2363 of the second prism 236, enters the third prism 238 through the light access surface 2382, is reflected by the third prism 238, leaves the third prism 238 through the light access surface 2382, and enters the light receiver 260. It is noted that the baseline L' is parallel to an optical axis passing through the objective module 210 and ocular module 240.

In another embodiment, the prism module 230 has the third prism, and the light receiver 260 is disposed above or below the Schhmidt-Pechan prism. However, the prism module 130 does not have the third prism.

In yet another embodiment, the organic light-emitting diode is disposed in the second optical system 200, and the first optical system 100 does not have the organic light-emitting diode. The path along which the light beam containing an image travels in the prism module 230 is similar to that in the prism module 130 in the above embodiment, and therefore the descriptions thereof are omitted.

In the described binocular, the light source and light receiver for measuring distance can be disposed above or below the prism module, because a third prism is provided in the prism module. Such an arrangement provides an additional space for mounting an organic light-emitting diode. Therefore, the product (binocular) can be diversified.

What is claimed is:

1. A prism module, comprising:
    a first prism comprising a first surface, a second surface and a third surface;
    a roof prism comprising a roof surface and a fourth surface adjacent to the second surface;
    a second prism comprising a fifth surface, a sixth surface adjacent to the third surface, and a seventh surface; and
    a third prism disposed higher than the second prism;
    wherein the third prism comprises a light access surface, a first reflecting surface and a second reflecting surface, and the light access surface is partly adjacent to the seventh surface;
    wherein a baseline is configured to pass through the first and the second surfaces of the first prism and the fourth surface of the roof prism;
    wherein a light source is disposed above the second prism, near a side of the third prism, and adjacent to the first and the roof prisms;
    wherein the light source is configured to emit a first light beam;
    wherein the first light beam enters the third prism, is reflected by the third prism, enters the second prism through the seventh surface, passes through the sixth surface of the second prism, enters the first prism through the third surface, is reflected by the second surface of the first prism, and leaves the prism module;
    wherein the first light beam leaving the prism module is parallel to the baseline.

2. The prism module as claimed in claim 1, wherein the first light beam enters the third prism through the light access surface, and is reflected by the first and the second reflecting surfaces to enter the second prism through the light access surface.

3. The prism module as claimed in claim 1, wherein the first prism further comprises a coating disposed on the second surface, and the first light beam is reflected by the coating to leave the prism module.

4. The prism module as claimed in claim 1, wherein a visible light beam enters the first prism through the first surface, is reflected a plurality of times in the first prism, leaves the first prism through the second surface, enters the roof prism through the fourth surface, is reflected a plurality of times in the roof prism, and leaves the prism module, and the visible light beam leaving the prism module is parallel to the baseline.

5. The prism module as claimed in claim 1, wherein a second light beam comprising an image enters the second prism through the fifth surface, leaves the second prism through the sixth surface, passes through the first prism, enters the roof prism, is reflected by the roof prism and the fourth surface, and leaves the prism module in a direction parallel to the baseline.

6. The prism module as claimed in claim 1, wherein the first prism further comprises a coating disposed on the second surface, and the coating is configured to reflect an invisible light beam and allow a visible light beam to pass through.

7. A binocular capable of measuring distance comprising:
    a first optical system; and
    a second optical system arranged parallel to the first optical system;
    wherein the first optical system comprises an objective module, the prism module as claimed in claim 1, and an ocular module;
    wherein the second optical system comprises a light receiver;
    wherein the first light beam emitted by the light source passes through the third prism, the prism module and the objective module, is projected to an object, is reflected by the object to the second optical system, and is received by the light receiver.

8. The prism module as claimed in claim 7, wherein the first prism further comprises a coating disposed on the second surface, and the coating is configured to reflect an invisible light beam and allow a visible light beam to pass through.

9. A prism module, comprising:
    a first prism comprising a first surface, a second surface and a third surface;

a roof prism comprising a roof surface and a fourth surface adjacent to the second surface;

a second prism comprising a fifth surface, a sixth surface adjacent to the third surface, and a seventh surface; and a third prism disposed higher than the second prism;

wherein the third prism comprises a light access surface, a first reflecting surface and a second reflecting surface, and the light access surface is partly adjacent to the seventh surface;

wherein a baseline is configured to pass through the first and the second surfaces of the first prism and the fourth surface of the roof prism;

wherein a light receiver is disposed above the second prism, near a side of the third prism, and adjacent to the first and the roof prisms;

wherein a first light beam parallel to the baseline enters the first surface of the first prism, is reflected by the first prism, enters the second prism through the third surface, passes through the seventh surface of the second prism, enters the third prism through the light access surface, and is reflected by the third prism to leave the prism module through the light access surface.

10. The prism module as claimed in claim 9, wherein the first light beam enters the third prism through the light access surface, and is reflected by the first and the second reflecting surface to enter the light receiver through the light access surface.

11. The prism module as claimed in claim 9, wherein the first prism further comprises a coating disposed on the second surface, and the first light beam is reflected by the coating to leave the prism module.

12. The prism module as claimed in claim 9, wherein a visible light beam enters the first prism through the first surface, is reflected a plurality of times in the first prism, leaves the first prism through the second surface, enters the roof prism through the fourth surface, is reflected a plurality of times in the roof prism, and leaves the prism module, and the visible light beam leaving the prism module is parallel to the baseline.

13. The prism module as claimed in claim 9, wherein a second light beam comprising an image enters the second prism through the fifth surface, leaves the second prism through the sixth surface, passes through the first prism, enters the roof prism, is reflected by the roof prism and the fourth surface, and leaves the prism module in a direction parallel to the baseline.

14. The prism module as claimed in claim 9, wherein the first prism further comprises a coating disposed on the second surface, and the coating is configured to reflect an invisible light beam and allow a visible light beam to pass through.

15. The prism module as claimed in claim 14, wherein a visible light beam enters the first prism through the first surface, is reflected a plurality of times in the first prism, leaves the first prism through the second surface, enters the roof prism through the fourth surface, is reflected a plurality of times in the roof prism, and leaves the prism module, and the visible light beam leaving the prism module is parallel to the baseline.

16. The prism module as claimed in claim 14, wherein a second light beam comprising an image enters the second prism through the fifth surface, leaves the second prism through the sixth surface, passes through the first prism, enters the roof prism, is reflected by the roof prism and the fourth surface, and leaves the prism module in a direction parallel to the baseline.

17. A binocular capable of measuring distance comprising:

a first optical system; and a second optical system arranged parallel to the first optical system;

wherein the second optical system comprises an objective module, the prism module as claimed in claim 9, and an ocular module;

wherein the first optical system comprises a light source;

wherein the first light beam emitted by the light source is projected to an object through the first optical system, is reflected by the object to enter the prism module through the objective module, is reflected by the prism module, and enters the light receiver through the third prism.

18. The prism module as claimed in claim 17, wherein a visible light beam enters the first prism through the first surface, is reflected a plurality of times in the first prism, leaves the first prism through the second surface, enters the roof prism through the fourth surface, is reflected a plurality of times in the roof prism, and leaves the prism module, and the visible light beam leaving the prism module is parallel to the baseline.

19. The prism module as claimed in claim 17, wherein a second light beam comprising an image enters the second prism through the fifth surface, leaves the second prism through the sixth surface, passes through the first prism, enters the roof prism, is reflected by the roof prism and the fourth surface, and leaves the prism module in a direction parallel to the baseline.

20. The prism module as claimed in claim 17, wherein the first prism further comprises a coating disposed on the second surface, and the coating is configured to reflect an invisible light beam and allow a visible light beam to pass through.

* * * * *